(12) United States Patent
Senoue et al.

(10) Patent No.: US 7,745,793 B2
(45) Date of Patent: Jun. 29, 2010

(54) INFRARED SIGNAL RECEIVER, LIQUID CRYSTAL DISPLAY AND OPTICAL ELEMENT

(75) Inventors: Masaharu Senoue, Miyagi (JP); Kazuhiko Morisawa, Miyagi (JP); Takashi Watanabe, Miyagi (JP); Shunichi Kajiya, Miyagi (JP); Kenichi Sasaki, Miyagi (JP); Hitomi Madokoro, Miyagi (JP); Yuji Takahashi, Miyagi (JP); Rie Tsubo, Miyagi (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 11/769,446

(22) Filed: Jun. 27, 2007

(65) Prior Publication Data

US 2008/0165310 A1    Jul. 10, 2008

(30) Foreign Application Priority Data

Jun. 28, 2006   (JP)   ............. P2006-177578
Jun. 11, 2007   (JP)   ............. P2007-153759

(51) Int. Cl.
*G01C 3/08* (2006.01)
(52) U.S. Cl. ................... 250/353; 250/338.1
(58) Field of Classification Search ............. 250/353, 250/338.1
See application file for complete search history.

(56) References Cited

U.S. PATENT DOCUMENTS

2004/0213576 A1*  10/2004  Tan et al. .............. 398/140
2006/0092401 A1*  5/2006   Troxell et al. .......... 356/4.01
2008/0118104 A1*  5/2008   Ariyur et al. .......... 382/103

FOREIGN PATENT DOCUMENTS

| JP | 06-176873   | 6/1994  |
|----|-------------|---------|
| JP | 11-205225   | 7/1999  |
| JP | 2000-148317 | 5/2000  |
| JP | 2001-094124 | 4/2001  |
| JP | 2002-258760 | 9/2002  |
| JP | 2004-274389 | 9/2004  |
| JP | 2005-272660 | 10/2005 |
| JP | 2006-041657 | 2/2006  |

OTHER PUBLICATIONS

Japanese Office Action issued on Jan. 27, 2009, for corresponding Japanese Patent Application JP 2007-153759.

* cited by examiner

*Primary Examiner*—Georgia Y Epps
*Assistant Examiner*—Tony Ko
(74) *Attorney, Agent, or Firm*—K&L Gates LLP

(57) ABSTRACT

There is provided an infrared signal receiver which includes a photo-detector unit receiving light in a predetermined infrared wavelength region, sent from a remote operating unit; and an optical element disposed in front of the photo-detector unit, allowing the light of the predetermined infrared wavelength region to transmit therethrough in preference to other infrared wavelength region. In the receiver, the predetermined signal wavelength region is a region of 930 nm or longer and 960 nm or shorter, and mean transmittance of light of the optical element in the predetermined signal wavelength region is larger than mean transmittance of light in a region of 900 nm or longer and shorter than 930 nm, and/or, mean transmittance of light in a region of longer than 960 nm and 1,020 nm or shorter.

12 Claims, 12 Drawing Sheets

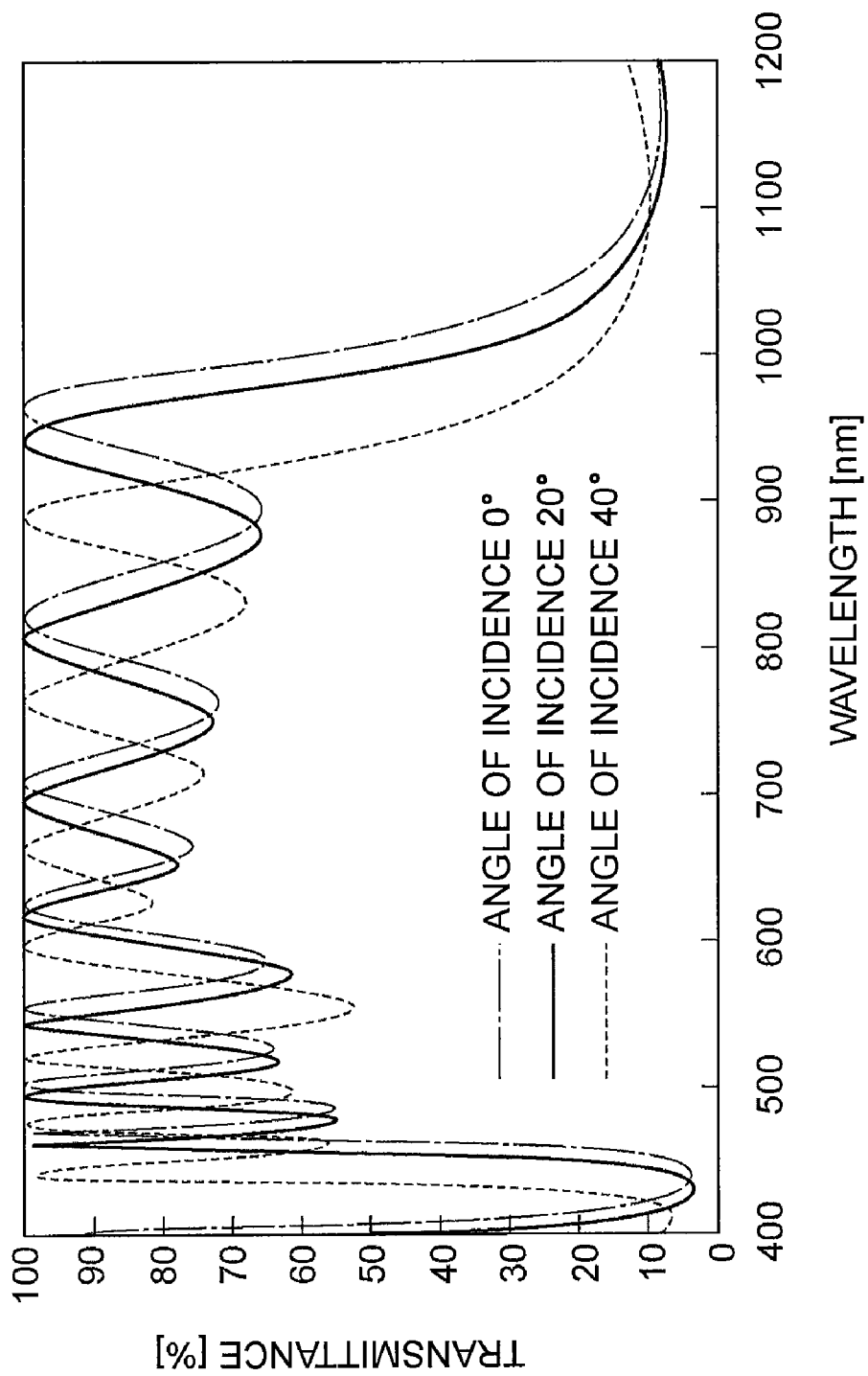

INFRARED SIGNAL RECEIVER, LIQUID CRYSTAL DISPLAY AND OPTICAL ELEMENT

CROSS REFERENCE TO RELATED APPLICATIONS

The present application claims priority to Japanese Patent Application JP 2006-177578 filed in the Japanese Patent Office on Jun. 28, 2006, and Japanese Patent Application JP 2007-153759 filed in the Japanese Patent Office on Jun. 11, 2007, the entire contents of which is being incorporated herein by reference.

BACKGROUND

The present application relates to an infrared signal receiver, a liquid crystal display, and an optical element applicable thereto, capable of suppressing degradation of sensitivity to remote controllers of video display devices such as liquid crystal display and its peripheral instruments, caused by near infrared radiation emitted, for example, from the liquid crystal display.

Today's video display is diversified into several categories including cathode ray tube display, plasma display, liquid crystal display and so forth. Almost all of these video displays are given with remote operating units, that is, remote controllers making use of near infrared communication. Signal wavelength of a general remote controller, and a sensitivity curve of its photo-detector unit are shown in FIG. 13. The signal wavelength of the remote controller shows a single peak having the center at 940 nm, and a half-value width of 50 nm or around. On the other hand, the photo-detector unit has sensitivity over a broad range from 850 nm to 1150 nm.

Under the environment such that near infrared radiation other than that of the remote controller signal also exists, in addition to the remote controller signal, in the wavelength region in which the photo-detector unit shows its sensitivity, sensitivity of communication with the remote controller will degrade, and distance allowing communication between the remote controller and the main unit of communication instrument will be reduced. In particular, plasma display is known to emit a huge energy of near infrared radiation which is causative of degradation in sensitivity to remote controllers of infrared communication instruments (for example, portable handset of telephone set, air conditioner, optical disc drive, etc.) placed at around the display.

As a countermeasure therefor, it has been known that provision of an optical filter containing a dye capable of absorbing light having wavelength in the near infrared region, in front of the display is effective (see Japanese Patent Application Publication (KOKAI) No. 2005-272660 (Patent Document 1), for example). Most of current plasma displays adopt this sort of optical filter.

Japanese Patent Application Publication (KOKAI) No. 2006-41657 (Patent Document 2) discloses a configuration such that an optical filter intercepting a predetermined wavelength of light emitted from the plasma display is provided to the photo-detector unit of the remote controller, in order to suppress influences of the predetermined wavelength of light in the near infrared region emitted from the plasma display exerted on the infrared communication. Considering now that the peak wavelength of infrared radiation emitted from the plasma display resides in the range from 825 nm and 880 nm, the optical filter is configured as characteristically showing a transmittance of light of 80% or more in the wavelength region longer than 900 nm, reducing the transmittance of light in the range from 900 nm to 800 nm, and showing a transmittance of light of nearly 0% in the wavelength region shorter than 800 nm.

By the way, also liquid crystal display, besides the plasma display, has emerged as a flat screen television set, and has been becoming the main stream of recent large-sized television sets. Recent trend in increase in screen size of the liquid crystal display causes gradual increase also in the energy of near infrared radiation emitted from the back light, while being still in a level lower than the plasma display. FIG. 14 shows an emission spectrum of the liquid crystal display in the near infrared region.

A known method of intercepting the near infrared radiation emitted from the back light of the liquid crystal display is such as providing a dye-containing filter on the display side, similarly to as in the plasma display. The near infrared absorbing dye, however, generally shows a slight absorption also in the visible light region, and therefore lowers luminance of displayed video image. For the liquid crystal television set, allowed for only a narrower range of luminance as compared with plasma television set, it is very difficult to compensate the loss of luminance caused by absorption by the filter, with the aid of output of the back light or the like.

On the other hand, another possible method is such as disposing, at the photo-detector unit of the remote controller, an optical filter capable of intercepting a predetermined wavelength of near infrared radiation emitted from the display, as disclosed in Patent Document 2. However, unlike the infrared radiation emitted from the plasma display, the infrared radiation emitted from the liquid crystal display shows a peak wavelength at 911 nm, 922 nm, 965 nm and 1,013 nm as shown in FIG. 14. As a consequence, even use of the above-described optical filter having a transmittance of light, longer than 900 nm, of 80% or more cannot provide a countermeasure against infrared radiation emitted from the liquid crystal display.

SUMMARY

The subject matter of the present application was conceived after considering the above-described problems, and provides an infrared signal receiver, a liquid crystal display, and an optical element applicable thereto, capable of suppressing degradation of sensitivity to remote controllers of liquid crystal display and its peripheral instruments, caused by near infrared radiation emitted from the liquid crystal display.

According to an embodiment aimed at solving the above-described subject, there is provided an optical element disposed in front of a photo-detector unit which receives signal in an infrared wavelength region sent from a remote operating unit, allowing the signal wavelength region to transmit therethrough in preference to other infrared wavelength region, the optical element having mean transmittance of light in a region from 930 nm or longer and 960 nm or shorter, larger than mean transmittance of light in a region from 900 nm or longer and 930 nm or shorter, and/or, mean transmittance of light in a region 960 nm or longer to 1,020 nm or shorter.

By disposing thus-composed optical element in front of the photo-detector unit, amount of energy of infrared radiation emitted from the liquid crystal display and possibly reaching the photo-detector unit can effectively be reduced, while allowing the signal wavelength region of the remote operating unit (remote controller) ranging from 930 nm or longer and 960 nm or shorter to transmit therethrough in a preferential manner. This configuration can suppress degradation in the receiving sensitivity caused by infrared radiation emitted from the liquid crystal display.

The infrared signal receiver according to an embodiment is configured by disposing thus-configured optical element in front of a photo-detector unit receiving signal sent from a remote operating unit, and is applicable to photo-detector unit, receiving the remote controller signal, of electronic instruments installed around the liquid crystal display, or in places where infrared radiation emitted from the liquid crystal display can reach, such as portable handset of telephone set, air conditioner, optical disc drive and so forth.

By disposing thus-configured optical element at the photo-detector unit, receiving the remote controller signal, of the liquid crystal display, also the liquid crystal display per se can be prevented from being excessively degraded in the receiving sensitivity to the remote controller signal, caused by infrared radiation emitted therefrom.

Additional features and advantages are described herein, and will be apparent from, the following Detailed Description and the figures.

BRIEF DESCRIPTION OF THE FIGURES

FIG. 5 is a drawing showing an exemplary angle dependence of transmittance of an optical multi-layered film.

DETAILED DESCRIPTION

A detailed description follows with reference to the figures according to various embodiments.

Figure 1:
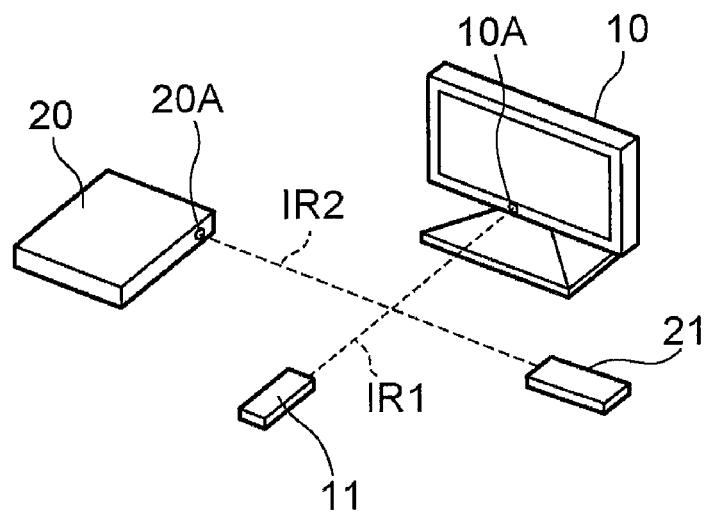
FIG. 1 is a schematic drawing explaining an embodiment, showing a remote controller-assisted communication environment of a liquid crystal display and an optical disc drive disposed therearound.

FIG. 1 to FIG. 4 show an embodiment. As shown in FIG. 1, an optical disc drive 20 such as a DVD player, for example, is disposed as a peripheral instrument in the vicinity of a liquid crystal display 10.

The liquid crystal display 10 as a liquid crystal television set has a photo-detector unit 10A receiving an infrared signal IR1 sent from a remote operating unit (remote controller) 11. On the other hand, the optical disc drive 20 has a photo-detector unit 20A receiving an infrared signal IR2 sent from a remote operating unit (remote controller) 21.

The remote controllers 11, 21 modulate input operation signals to convert them into the infrared signals IR1, IR2, and send them to the liquid crystal display 10 and to the optical disc drive 20, respectively. Thus-sent infrared signals IR1, IR2 are received by the photo-detector units 10A, 20A of the liquid crystal display 10 and the optical disc drive 20, respectively, and then demodulated. By this process, operations of the liquid crystal display 10 and the optical disc drive 20 are controlled based on thus-sent operation signals. It is noted that, the infrared signals IR1, IR2 are generated, for example, by a light emitting diode built in each of the remote controllers 11, 21.

Figure 13:
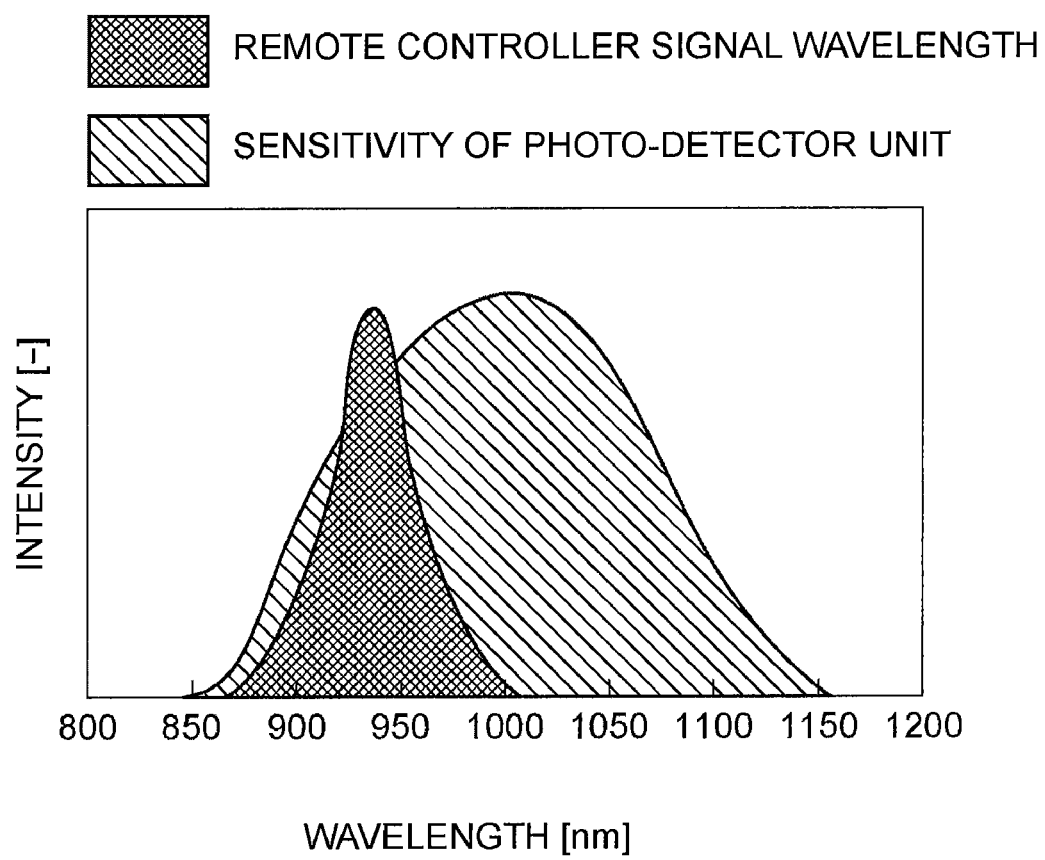
FIG. 13 is a drawing explaining a relation between signal wavelength of the remote controller and sensitivity of the photo-detector unit.

The signal wavelength of the remote controllers 11, 12 shows a single peak having the center at 940 nm as shown in FIG. 13, and a half-value width of 50 nm or around. On the other hand, the photo-detector units 10A, 20A have sensitivity over a broad range from 850 nm to 1,150 nm.

Figure 14:
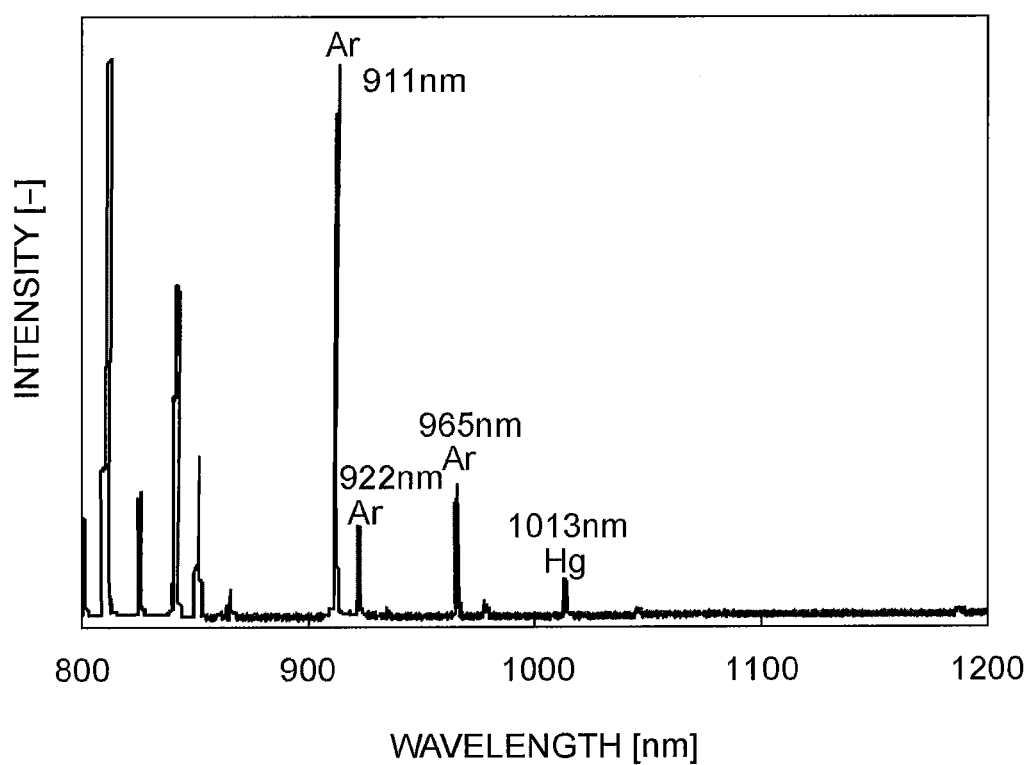
FIG. 14 is a drawing showing an emission spectrum of infrared radiation emitted from the liquid crystal display.

The liquid crystal display 10 has a back light composed of a cold cathode fluorescent tube. The cold cathode fluorescent tube generally has Ar (argon) gas and Hg (mercury) gas confined therein. For this reason, a liquid crystal display having the cold cathode fluorescent tube as a back light emits, as shown in FIG. 14, near infrared radiation having three luminescent line peaks at 911 nm, 922 nm and 965 nm ascribable to Ar, and a luminescent line peak at 1,013 nm ascribable to Hg. Large energy of three luminescent line ascribable to Ar (hereafter, referred to as "Ar luminescent line") is observed immediately after the television set was powered on, but the energy attenuates with the elapse of time. Conversely, the luminescent line ascribable to Hg (hereafter, referred to as "Hg luminescent line") increases as the temperature inside the cold cathode fluorescent tube elevates and thereby the amount of Hg vapor increases.

Near infrared radiation emitted from the liquid crystal display 10 overlaps the distribution range of the receiving sensitivity of the remote controller photo-detector unit 10A of the liquid crystal display 10 per se, and the remote controller photo-detector unit 20A of the optical disc drive 20. In addition, it is readily reflected by the room wall, furniture, clothes of the user and the like. Thus, it is anticipated that the sensitivity of the remote controllers of the liquid crystal display 10 and the optical disc drive 20 may degrade, due to near infrared radiation emitted from the liquid crystal display 10.

Therefore in this embodiment, aiming at suppressing lowering in the sensitivity and malfunction of the remote controllers of the peripheral instruments and the liquid crystal display per se, ascribable to near infrared radiation emitted from the liquid crystal display 10, an optical element 4 described later is provided in front of the photo-detector unit 10A of the liquid crystal display 10, and in front of the photo-detector unit 20A of the optical disc drive 20.

Figure 2:
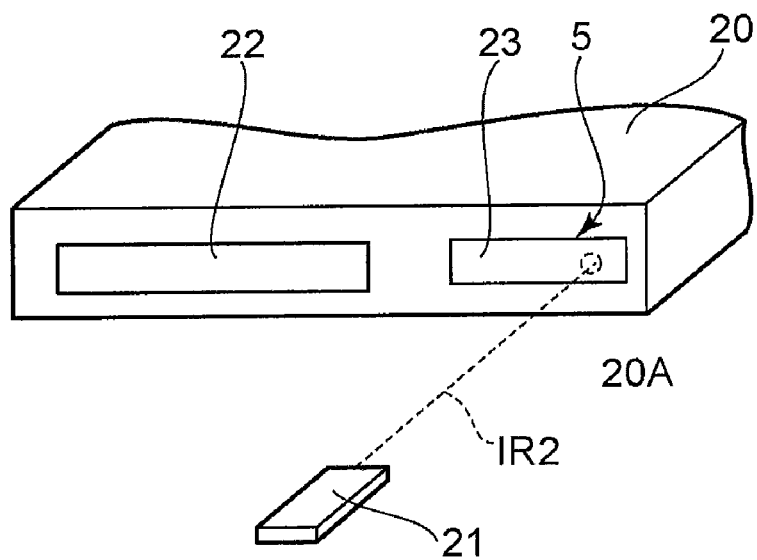
FIG. 2 is a schematic drawing explaining a photo-detector unit, detecting a remote controller signal, of the optical disc drive shown in FIG. 1.

The photo-detector unit 10A and the photo-detector unit 20A are provided generally on the front portions of the liquid crystal display 10 and the optical disc drive 20, respectively. FIG. 2 shows an exemplary placement of the photo-detector unit 20A of the optical disc drive 20. The front portion of the optical disc drive 20 has, arranged therein, an optical disc slot 22, a display unit 23 displaying time and operation state, and operation keys for supplying power and various terminals. The photo-detector unit 20A is composed of an infrared signal receiver 5 incorporated in the display unit 23.

Figure 3:
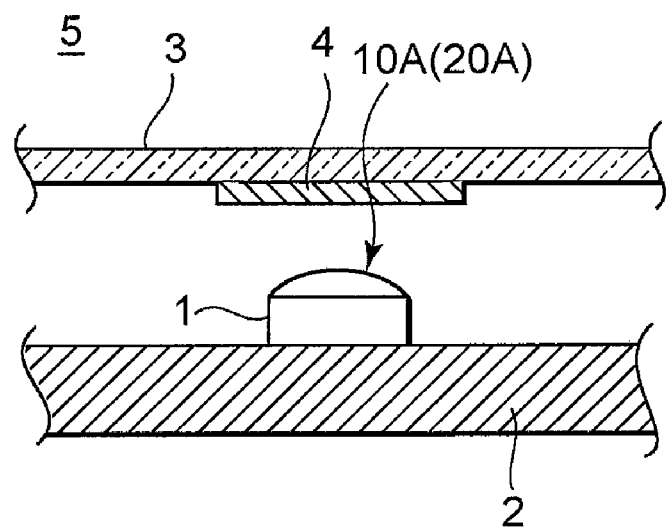
FIG. 3 is a sectional view schematically showing a configuration of an infrared signal receiver constituting each of the photo-detector units of the liquid crystal display and the optical disc drive shown in FIG. 1.

FIG. 3 is a schematic drawing showing a configuration of the infrared signal receiver 5. The infrared signal receiver 5 has a beam-receiving sensor 1 composed of a photo-diode or a photo-transistor, and the optical element 4 disposed in front of the beam-receiving sensor 1. The beam-receiving sensor 1 is mounted typically on a control board constituting the display unit 23. The photo-detector units 10A, 20A are composed of the photo-detector units of the beam-receiving sensor 1. The optical element 4 is bonded onto the inner surface of a cover plate 3 to oppose to the beam-receiving sensor 1.

The optical element 4 is aimed at allowing the signal wavelength region of the infrared signals IR1, IR2 sent from the remote controllers 11, 21 to transmit therethrough in preference to other infrared wavelength region. More specifically, the optical element 4 of this embodiment has a characteristic (first characteristic) that a mean transmittance in the wavelength region from 930 nm or longer and 960 nm or shorter is larger than a mean transmittance of light in the wavelength region above 960 nm and 1,020 nm or shorter. Alternatively, the optical element 4 of this embodiment has a characteristic (second characteristic) that a mean transmittance in the wavelength region from 930 nm or longer and 960 nm or shorter is larger than a mean transmittance of light in the wavelength region of 900 nm or longer and 930 nm or shorter. Preferably, the optical element 4 of this embodiment is configured as having a characteristic (third characteristic) which satisfies the first characteristic and the second characteristic at the same time.

Figure 9A:
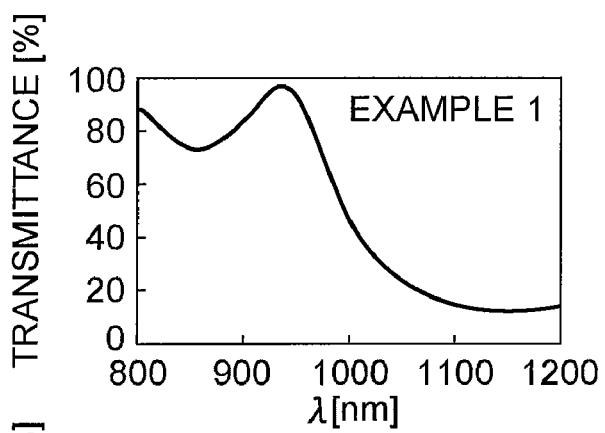
FIGS. 9A to 9D are drawings showing spectral transmittance curves of the optical elements according to Examples 1 to 4 of an embodiment.

One example of spectral transmittance characteristic of the optical element 4 having the first characteristic is shown in FIG. 9A. In this example, the mean transmittance lies in a lower level in a longer wavelength region from 960 nm to 1020 nm than in the remote controller signal wavelength region from 930 nm to 960 nm. This characteristic contributes to suppress transmission of Ar luminescent line at 965 nm and Hg luminescent line at 1,013 nm shown in FIG. 14, while allowing transmission of the remote controller signal.

Figure 9B:
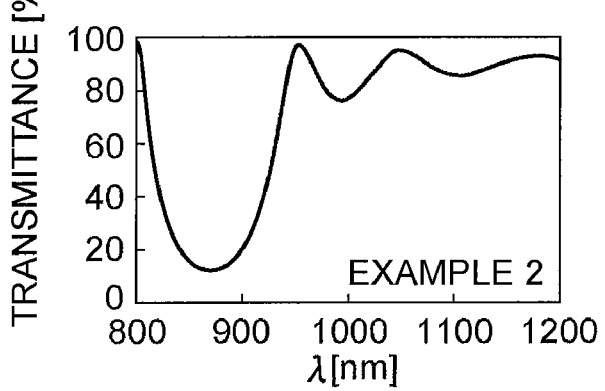

On the other hand, one example of spectral transmittance characteristic of the optical element 4 having the second characteristic is shown in FIG. 9B. In this example, the mean transmittance lies in a lower level in a shorter wavelength region from 900 nm to 930 nm than in the remote controller signal wavelength region from 930 nm to 960 nm. This characteristic contributes to suppress transmission of Ar luminescent lines at 911 nm and 922 nm shown in FIG. 14, while allowing transmission of the remote controller signal.

Figure 9C:
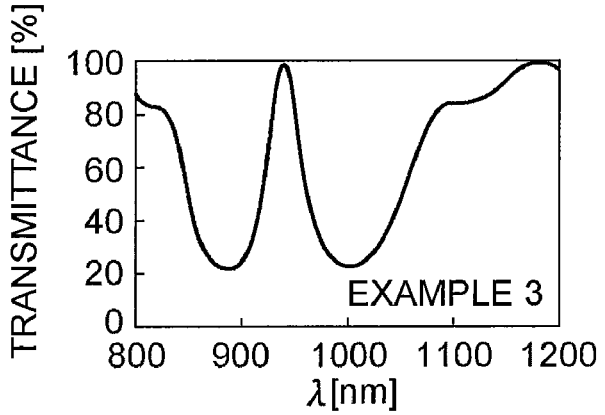

Furthermore, one example of spectral transmittance characteristic of the optical element 4 having the third characteristic is shown in FIG. 9C. This configuration can suppress transmission of Ar luminescent lines at 911 nm, 922 nm and 965 nm, and Hg luminescent line at 1,013 nm shown in FIG. 14, while allowing transmission of the remote control signal. The optical element having the third characteristic can be obtained, for example, by stacking the optical element having the first characteristic and the optical element having the second characteristic.

By disposing thus-configured optical element 4 in front of the photo-detector units 10A, 20A, energy of near infrared radiation generated by the back light of the liquid crystal display 10, emitted through the liquid crystal panel, and possibly reaches the photo-detector units 10A, 20A, can effectively be reduced. This also avoids malfunction of the optical disc drive 20 and the liquid crystal display 10, and ensures desirable remote controller operation environments for these instruments.

Here, for avoiding degradation of remote controller sensitivity at the time of TV power on, it is effective that the mean transmittance of light of the optical element 4 in the wavelength region of 930 nm or longer and 960 nm or shorter is higher than that in the Ar luminescent line wavelength region of 900 nm or longer and 1020 nm or shorter. In particular, by decreasing the transmittance of the infrared light having wavelength of 911 nm, whose noise amount is large, degradation of remote controller sensitivity soon after the TV is powered on is effectively suppressed. On the other hand, influence by the Hg luminescent line peak which occurs a while after the power-on is excluded by decreasing the transmittance of the infrared light having wavelength of 1013 nm.

Figure 4A:
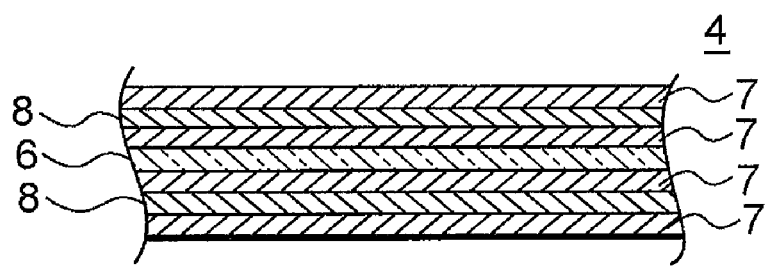
FIG. 4 is a sectional view showing an exemplary configuration of an optical element constituting the infrared signal receiver shown in FIG. 3.

The optical element 4 can be formed of a multi-layered film composed of a plurality of substances having different refractive indices, as shown in FIG. 4A. The optical element shown in FIG. 4A is formed of a multi-layered film having a plurality of high-refractive-index material layers 7 and low-refractive-index material layers 8 alternately stacked on a transparent support 6 composed of a transparent plastic (PET: polyethylene terephthalate, for example) or transparent glass or the like, having a transmittance of 90% or more for example.

The optical element 4 shown in FIG. 4A is configured as ensuring the transmittance in the wavelength region corresponded to wavelength of the remote controller signal raised higher than the transmittance in the other wavelength region, by making use of an interference effect of light caused by the multi-layered film, so as to allow near infrared radiation of the remote controller signal wavelength to transmit in preference to near infrared radiation of wavelength other than the signal wavelength.

The high-refractive-index material layer 7 and the low-refractive-index material layer 8 can be manufactured by dry processes such as vacuum evaporation and sputtering, or by wet processes such as dip coating. There are no specific limitations on constitutive materials, thickness, and number of stacking of the high-refractive-index material layer 7 and the low-refractive-index material layer 8, allowing appropriate selection depending on desired spectral transmittance characteristics.

For example, the high-refractive-index material layer 7 may be configured using a resin film containing $TiO_2$ particles (refractive index: 1.94), and the low-refractive-index material layer 8 may be configured using a fluorine-containing resin (refractive index: 1.34). Alternatively, the high-refractive-index material layer 7 may be configured using a film composed of $Nb_2O_5$, $Ta_2O_5$, or $ZrO_2$, in place of $TiO_2$, or a coated film containing any of these particles, and the low-refractive-index material layer 8 may be configured using a film of $SiO_2$, $MgF_2$, in place of the fluorine-containing resin, or a coated film containing any of these particles.

Moreover, in order to suppress photo-degradation, the high-refractive-index material layer 7 may contain cobalt, zirconia, aluminum oxide, silicon oxide, stearic acid or the like. For example, the high-refractive-index material layer 7 is configured by a coated film containing conductive cobalt-containing $TiO_2$ particles, or a coated film of cobalt-containing $TiO_2$ particles coated with a conductive substance. Examples of the conductive substance include inorganic compound containing at least one element selected from tin, indium, antimony, zinc, aluminum, silicon, zirconium and manganese.

The optical multi-layered film varies its transmission characteristics depending on angle of incidence of light, and has a tendency, as shown in FIG. 5, in which the waveform shifts towards the shorter wavelength side as the angle of incidence becomes larger. Therefore, when the remote controller emits the signal beam at angles different from the front direction of the photo-detector unit, the bottom of transmittance which resides on the longer wavelength side of the remote controller signal shifts towards the shorter wavelength side. Accordingly, transmittance of the remote controller signal may be degraded depending on relation between optical design of the multi-layered film and angle of operation of the remote controller, to thereby lower the sensitivity.

Figure 6A:
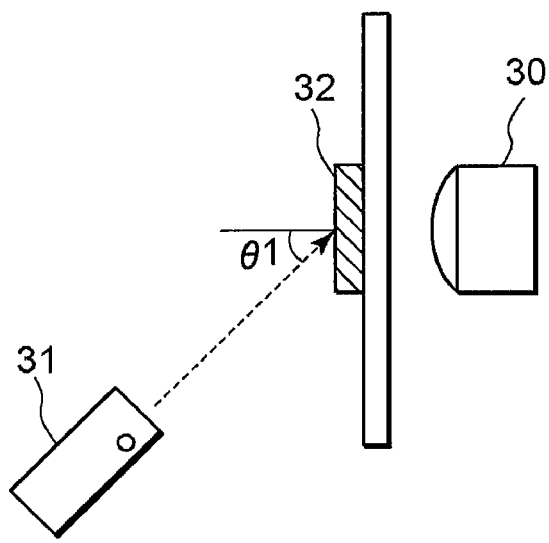
FIGS. 6A and 6B are explanatory drawings comparatively showing configurations of photo-detector units with or without a light guide pipe.
Figure 6B:
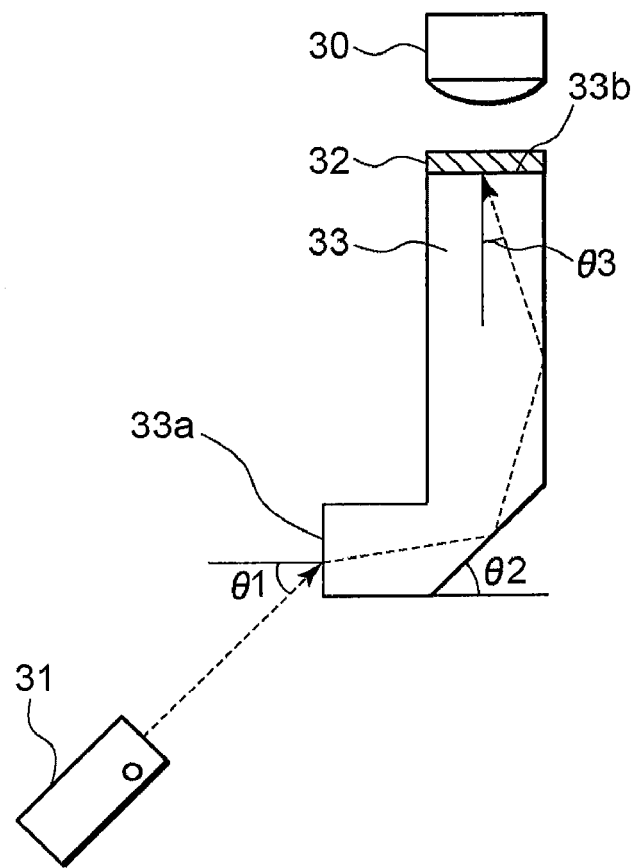

For the purpose of moderating such nonconformity, it is preferable to dispose a light guide pipe (beam guide component) modifying the direction of propagation of beam in front of the photo-detector unit, and a multi-layered film on the extraction surface side of the light guide pipe. The configuration will be explained referring to FIGS. 6A and 6B. FIG. 6A shows a state in which infrared beam emitted from a remote operating unit (remote controller) 31 towards a photo-detector unit 30 is incident on an optical element 32 disposed just in front of the photo-detector unit 30 at angle $\theta 1$. On the other hand, FIG. 6B shows a configuration in which the front direction of the photo-detector unit 30 is off-aligned from the direction of emission of the infrared beam from the remote controller 31, and having a transparent light guide pipe 33 modifying the direction propagation of the infrared beam disposed between the remote controller 31 and the photo-detector unit 30. The optical element 32 is disposed on a beam exit surface 33b, opposing to the photo-detector unit 30, of the light guide pipe 33.

As shown in FIG. 6B, the infrared beam incident on a beam incidence surface 33a of the light guide pipe 33 reaches the beam exit surface 33b after being modified in the direction of propagation thereof. For an exemplary case where the light guide pipe 33 is made of acrylic resin (refractive index: 1.49), and both of $\theta 1$ and $\theta 2$ are 45°, $\theta 3$ can be adjusted to 28°. As a consequence, the angle of incidence on the optical element 32 for the condition shown in FIG. 6B can be reduced as compared with the condition shown in FIG. 6A, even under the same angle of incidence $\theta 1$ on the beam incidence surface 33a, and thereby the amount of change in the transmittance characteristics due to the multi-layered film can further be reduced.

Figure 7:
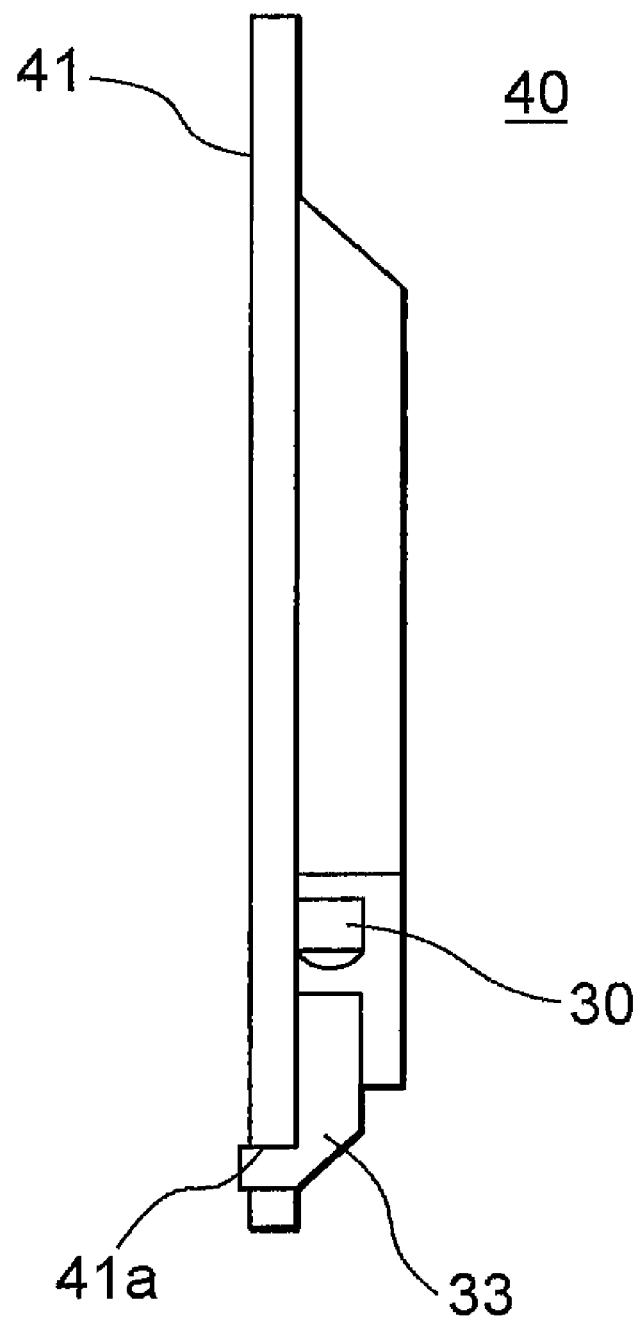
FIG. 7 is a side elevation of an exemplary application of the photo-detector unit with a light guide pipe, to a liquid crystal display.

Still another advantage of using the transparent light guide pipe 33 resides in stylishness of the main unit of the instrument having the remote control function. For an exemplary case where an outer frame 41 of the liquid crystal display 40 is composed of a transparent plate as shown in FIG. 7, it is more advantageous, in view of ensuring a fine unity of transparency of the outer frame 41, to dispose the photo-detector unit 30 on the back side of the display, so as to allow the signal beam to come in a beam receiving window 41a of the outer frame 41 to be received by the photo-detector unit 30 through the light guide pipe 33.

Figure 4B:
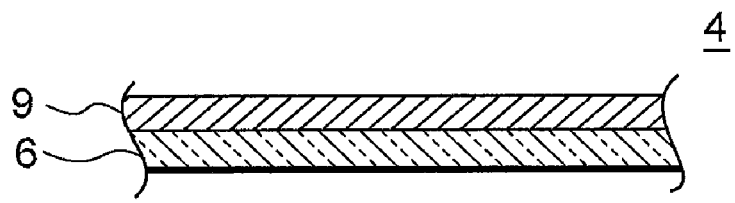

Next, the optical element 4 may adopt, in place of the multi-layered film, a dye capable of absorbing Ar luminescent lines and Hg luminescent line generated by the back light of the liquid crystal display 10. FIG. 4B shows a configuration of the optical element 4 having a dye layer 9 formed on the transparent support 6. Because the object can be satisfied simply by coating a dye in a coating formulation to produce a single layer in this case, the process can be simplified and the cost therefor can consequently be reduced. The dye layer 9 is advantageous as having no angle-independency in its light transmission characteristic. It is also possible to configure the optical element by combining the dye layer 9 with the above-described multi-layered film.

Dye showing absorption in the near infrared region can be exemplified by phthalocyanine compound and anthraquinone compounds. Examples of resins used for forming a film include acrylic resin, urethane resin, aliphatic ester resins, aromatic ester resin, melamine resin, polycarbonate resin, aliphatic polyolefin resin, aromatic polyolefin resin, polyvinyl resin, polyvinylalcohol resin, polyvinyl modified resin (PVB, EVA, etc.), and copolymer resin of these resins. It is also allowable to use optics-specialized resins such as "ARTON" (from JSR Corporation), "ZEONEX" (from Zeon Corporation), "OPTPOREZ" (from Hitachi Chemical Co., Ltd.), and "O-PET" (from Kanebo Ltd.). Applicable solvents include halogen-containing, alcoholic, ketone-base, ester-base, aliphatic-hydrocarbon-base, aromatic-hydrocarbon-base, and ether-base solvents. Mixed system of these solvents is also permissible.

The obtained coating liquid can be coated on a transparent resin film, transparent resin plate, transparent glass or the like, using a bar coater, blade coater, spin coater, reverse coater, die coater, spraying or the like, to form a coated film. It is also allowable to provide a protective layer, or to bond a glass or resin plate, film or the like onto the coated surface, so as to protect the coated surface.

Figure 8:
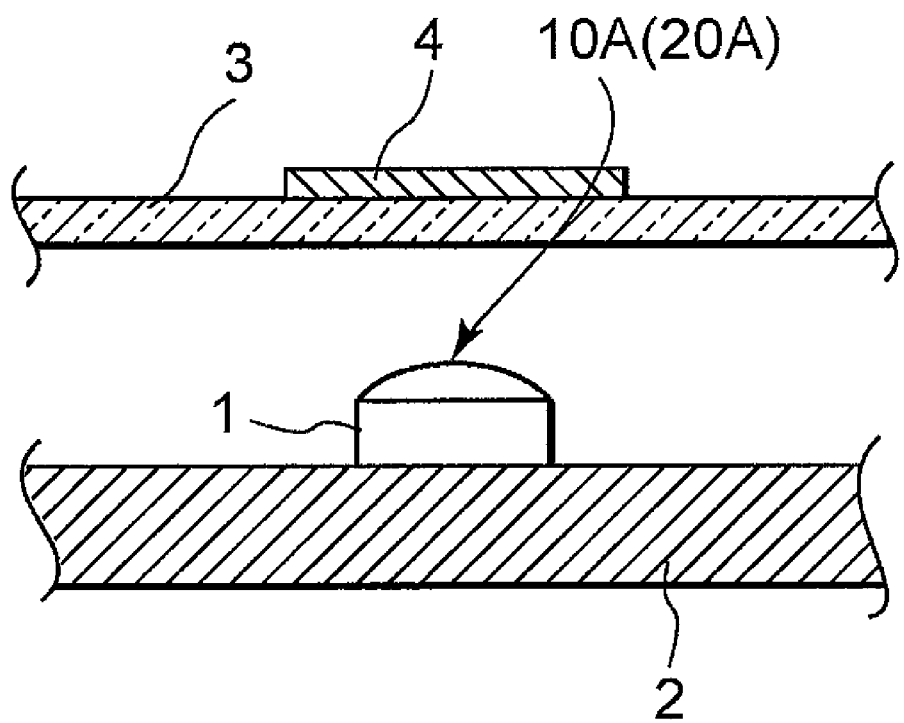
FIG. 8 is a sectional view showing an essential portion of a modified example of a configuration of the infrared signal receiver shown in FIG. 3.

Thus-configured optical element 4 is fixed onto the inner surface of the cover plate 3 shown in FIG. 3, while placing a pressure-sensitive adhesive layer (not shown) in between. The pressure-sensitive adhesive layer may preliminarily be provided onto the surface to which the optical element 4 will be attached, or may be coated onto the inner surface of the cover plate 3 when the optical element 4 is adhered. The surface to which the optical element 4 is attached is not limited to the inner surface of the cover plate 3, allowing the outer surface of the cover plate 3 as shown in FIG. 8. Also in this case, the optical element 4 is disposed so as to cover the front side of the photo-detector units 10A, 20A. The cover plate 3 per se may be configured by the optical element 4, or the optical element 4 may be formed directly on the photo-detector units 10A, 20A.

In a case of an optical element composed of an optical multilayer and a dye in combination, it is difficult to finely adjust the absorbing wavelength of the dye so that there may be a case the maximum transmittance of the optical element cannot be set to 940 nm, usual remote controller signal wavelength. In such a case, not only the noise but also part of the remote controller signal wavelength are intercepted, remote controller operable distance becomes shorter if there is no noise. Therefore, it is effective to match or mostly match the wavelength of the LED on the remote controller side with the transmittance peak wavelength of the optical element. In this case, the wavelength of the LED may be varied only within a wavelength range corresponding to the sensitivity of the remote control light receiver, and further, if a wavelength region in which the wavelength is higher than 940 nm (for example, 970 nm) is selected, the remote controller operable distance becomes longer.

As has been described in the above, the optical element 4 whose mean transmittance of light in the region of 930 nm or longer and 960 nm or shorter is larger than mean transmittance of light in the region of 900 nm or longer and 930 nm or shorter, and/or, mean transmittance of light in the region of 960 nm or longer and 1,020 nm or shorter, is disposed in front of the photo-detector units 10A, 20A in this embodiment. This allows energy of infrared radiation emitted from the liquid crystal display 10 and possibly reaches the photo-detector units 10A, 20A to be reduced effectively, while allowing the signal wavelength region of the remote controllers 11, 21 ranging from 930 nm or longer and 960 nm or shorter to transmit therethrough in a preferential manner. This configuration can suppress degradation in the remote controller receiving sensitivity of the liquid crystal display 10 and the optical disc drive 20 disposed therearound, caused by infrared radiation emitted from the liquid crystal display 10.

EXAMPLES

Paragraphs below will explain Examples of the present application. It is to be understood that Examples below are merely for the exemplary purposes, so that the present application is by no means limited to these Examples.

Several samples of the optical elements according to the embodiment were manufactured. As schematically shown in FIG. 11, each of thus-manufactured individual optical elements 4 was disposed in front of the photo-detector unit 20A of the optical disc drive 20 disposed 3 meters away from the liquid crystal display 10, and distance allowing communication with the remote controller 21 of the optical disc drive 20 under operation of the liquid crystal display 10 was measured, in comparison with the case without the optical element 4.

Example 1

As the optical element, a sample of the multi-layered film having the high-refractive-index material layers and the low-refractive-index material layers alternately stacked therein was manufactured. The high-refractive-index material layer used in manufacturing of the sample was a coated film containing $TiO_2$ particles. Composition of coating liquid A for forming the coated film was as follows.

(Coating Liquid A)
Pigment particle: $TiO_2$ particle (from Ishihara Sangyo Kaisha, Ltd., mean particle size: approximately 20 nm, refractive index: 2.48) 100 parts by weight
Binder: $SO_3Na$-group-containing urethane acrylate (number-average molecular weight: 350, $SO_3Na$ concentration: $1 \times 10^{-1}$ mol/g) 9.2 parts by weight
Dispersant: polyoxyethylene phosphate ester 7.5 parts by weight
Organic solvent: methyl isobutyl ketone (MIBK) 4,800 parts by weight
Ultraviolet (UV) curing resin: mixture of dipentaerythritol hexacrylate and dipentaerythritol pentacrylate (from Nippon Kayaku Co., Ltd., trade name: DPHA) 22 parts by weight Predetermined amounts of the above-described pigment particle, dispersant, binder and organic solvent were mixed, dispersed in a paint shaker, to thereby obtain dispersion liquid. A UV-curing resin was then added to the dispersion liquid, stirred using a stirrer, to thereby form coating liquid A. Refractive index of an optical film formed using the coating liquid A, measured using "Filmetrix" (from Matsushita Techno Trading Co., Ltd.), was found to be on the average 1.94 in the visible light region.

On the other hand, the low-refractive-index material layer used in manufacturing of the sample was a fluorine-containing resin film. Composition of coating liquid B for forming the resin film was as follows.

(Coating Liquid B)
Binder: Polymer perfluorobutenyl vinyl ether with terminal carboxyl group 100 parts by weight
Organic solvent: mixed solvent of fluorine-containing alcohol ($C_6F_{13}C_2H_4OH$) and perfluorobutylamine (ratio of mixing: 95:5) 1,666 parts by weight The binder and the organic solvent were mixed, and thoroughly stirred to prepare coating liquid B. Refractive index of an optical film formed using the coating liquid B, measured using "Filmetrix" (from Matsushita Techno Trading Co., Ltd.), was found to be on the average 1.34 in the visible light region.

Samples of the optical film were manufactured using the above-described coating liquids A and B.

Coating liquid A was coated on main surfaces of a PET film (188 μm thick, trade name U426 from Toray Industries, Inc.), by the dipping process. The thickness of the coated film was adjusted by pulling-up speed of the film. The coated film of coating liquid A was dried at 80° C., and cured by UV irradiation (1,000 $mJ/cm^2$), to thereby form the high-refractive-index material layer of 155 nm thick.

Next, coating liquid B was coated on thus-formed, high-refractive-index material layer by the dipping process. The thickness of the coated film was adjusted by pulling-up speed of the film. The coated film of coating liquid B was dried at room temperature, and cured by heating at 90° C., to thereby form the low-refractive-index material layer of 214 nm thick. The processes described in the above were repeated, so as to form the multi-layered film having 7 layers each on both surfaces of the PET film. Thickness of the individual layers are shown in Table 1.

TABLE 1

|  | first layer (nm) | second layer (nm) | third layer (nm) | fourth layer (nm) | fifth layer (nm) | sixth layer (nm) | seventh layer (nm) |
|---|---|---|---|---|---|---|---|
| Coating liquid | high* | low** | high | low | high | low | high |
| Example 1 | 155 | 214 | 155 | 214 | 155 | 214 | 155 |
| Example 2 | 343 | 473 | 343 | 473 | 343 | 473 | 343 |
| Example 3 | 371 | 511 | 371 | 511 | 371 | 511 | 371 |
| Example 4 | 134 | 209 | 134 | 209 | 134 | 209 | 134 |
| coating liquid Example 7 | dye 5000 | | | | | | |

*high = high refractive index material layer
**low = low refractive index material layer As the optical characteristic of thus-obtained samples, spectral transmittance was measured in increments of 1 nm using a spectral reflectivity meter. The obtained spectral transmittance curve is shown in FIG. 9A. Mean transmittance values of light in the region of 900 nm or longer and 930 nm or shorter, in the region of 930 nm or longer and 960 nm or shorter, and in the region of 960 nm or longer and 1,020 nm or shorter are listed in Table 2.

TABLE 2

|  | 900 nm–930 nm | 930 nm–960 nm | 960 nm–1020 nm |
|---|---|---|---|
| Example 1 | 91.5 | 93.7 | 59.3 |
| Example 2 | 35.8 | 85.0 | 81.5 |
| Example 3 | 45.8 | 79.4 | 29.9 |
| Example 4 | 85.4 | 91.1 | 56.8 |
| Example 5 | 6.9 | 34.5 | 33.0 |
| Example 6 | 33.2 | 79.3 | 48.8 |
| Example 7 | 5.8 | 43.3 | 83.9 |

Figure 12:
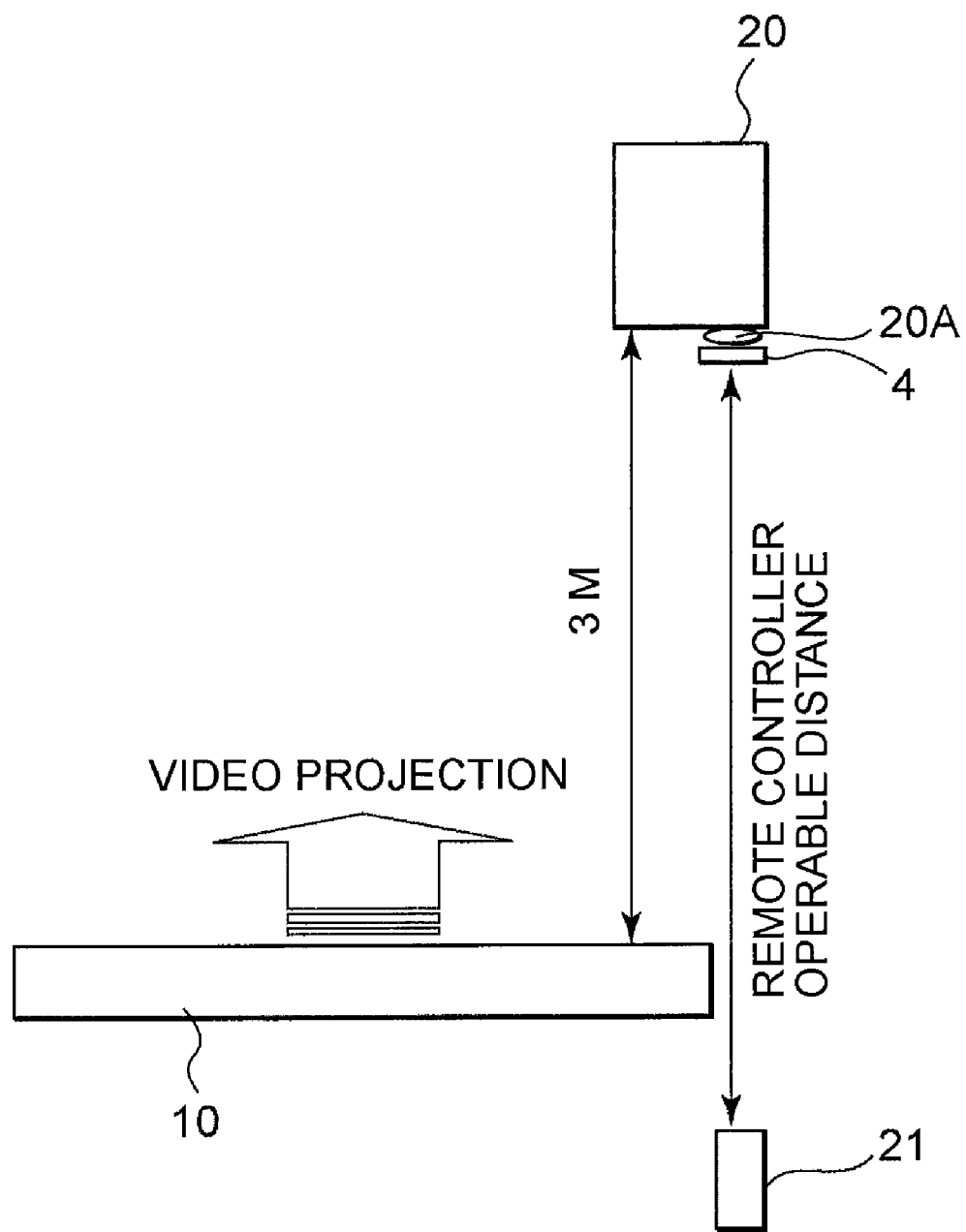
FIG. 12 is a drawing explaining a method of evaluating characteristics of the optical elements of an embodiment.

Thus-obtained samples of the optical element were evaluated in terms of operation guarantee effect for the remote controllers, according to the method below. First, the liquid crystal display (52-inch liquid crystal television set, from SONY Corporation) 10 and the optical disc drive (DVD player, from SONY Corporation) 20 were placed according to the positional relation shown in FIG. 12, and the sample of the optical element 4 was placed at the remote controller photo-detector unit 20A of the optical disc drive 20 so as to cover the entire portion of a window of the photo-detector unit. In this state, a test staff holding the remote controller 21 moved forward and backward so as to find the longest distance over which the optical disc drive 20 is operable using the remote controller, and defined the distance as the "remote controller operable distance", judging that a larger value of this distance means a larger effect of operation guarantee. The signal wavelength region of the remote controller 21 lies in the range of 930 nm or longer and 960 nm or shorter. Considering that near infrared radiation emitted from the liquid crystal display 10 is mainly ascribable to the Ar luminescent lines immediately after supply of power, and is mainly ascribable to the Hg luminescent line after the elapse of a certain period of time, the remote controller operable distance was measured immediately after activation, and 5 minutes after the activation of the back light of the liquid crystal display 10. Results of measurement of the remote controller operable distance are shown in Table 3.

TABLE 3

|  | Immediately after TV power on | 5 minutes after TV power on |
|---|---|---|
| Example 1 | 2 m | 13 m |
| Example 2 | 3 m | 8 m |
| Example 3 | 5 m | 12 m |
| Example 4 | 2 m | 13 m |
| Example 5 | 6 m | 11 m |
| Example 6 | 5 m | 12 m |
| Example 7 | 5 m | 8 m |
| Example 8 | 5 m | 9 m |
| Example 9 | 5 m | 9 m |
| Example 11 | 7 m | 13 m |
| Comparative Example | 2 m | 8 m |

Example 2

An optical element sample was manufactured according to a method similarly to as described above in Example 1, except that the thickness of the high-refractive-index material layer was adjusted to 343 nm, and the thickness of the low-refractive-index material layer was adjusted to 473 nm, and the transmittance and the remote controller operable distance were measured according to the methods similarly to Example 1 described above. Results of the measurement are shown in Table 2 and Table 3. A spectral transmittance curve of thus-obtained sample is shown in FIG. 9B.

Example 3

An optical element sample was manufactured according to a method similarly to as described above in Example 1, except that the thickness of the high-refractive-index material layer was adjusted to 371 nm, and the thickness of the low-refractive-index material layer was adjusted to 511 nm, and the transmittance and the remote controller operable distance were measured according to the methods similarly to Example 1 described above. Results of the measurement are shown in Table 2 and Table 3. A spectral transmittance curve of thus-obtained sample is shown in FIG. 9C.

Example 4

Figure 9D:
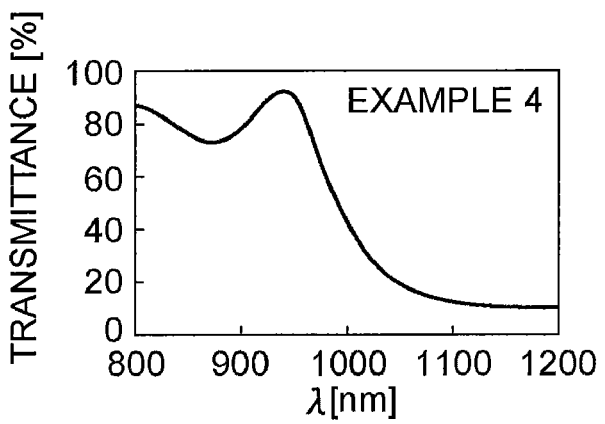

$Nb_2O_5$ was used for the high-refractive-index material layer, $SiO_2$ was used for the low-refractive-index material layer, and the multi-layered film was stacked by sputtering, only on one surface of the PET film similar to that used in Example 1. The thickness of the high-refractive-index material layer was adjusted to 134 nm, and the thickness of the low-refractive-index material layer was adjusted to 209 nm. The transmittance and the remote controller operable distance were measured according to the methods similarly to Example 1 described above. Results of the measurement are shown in Table 2 and Table 3. A spectral transmittance curve of thus-obtained sample is shown in FIG. 9D.

Example 5

Figure 10:
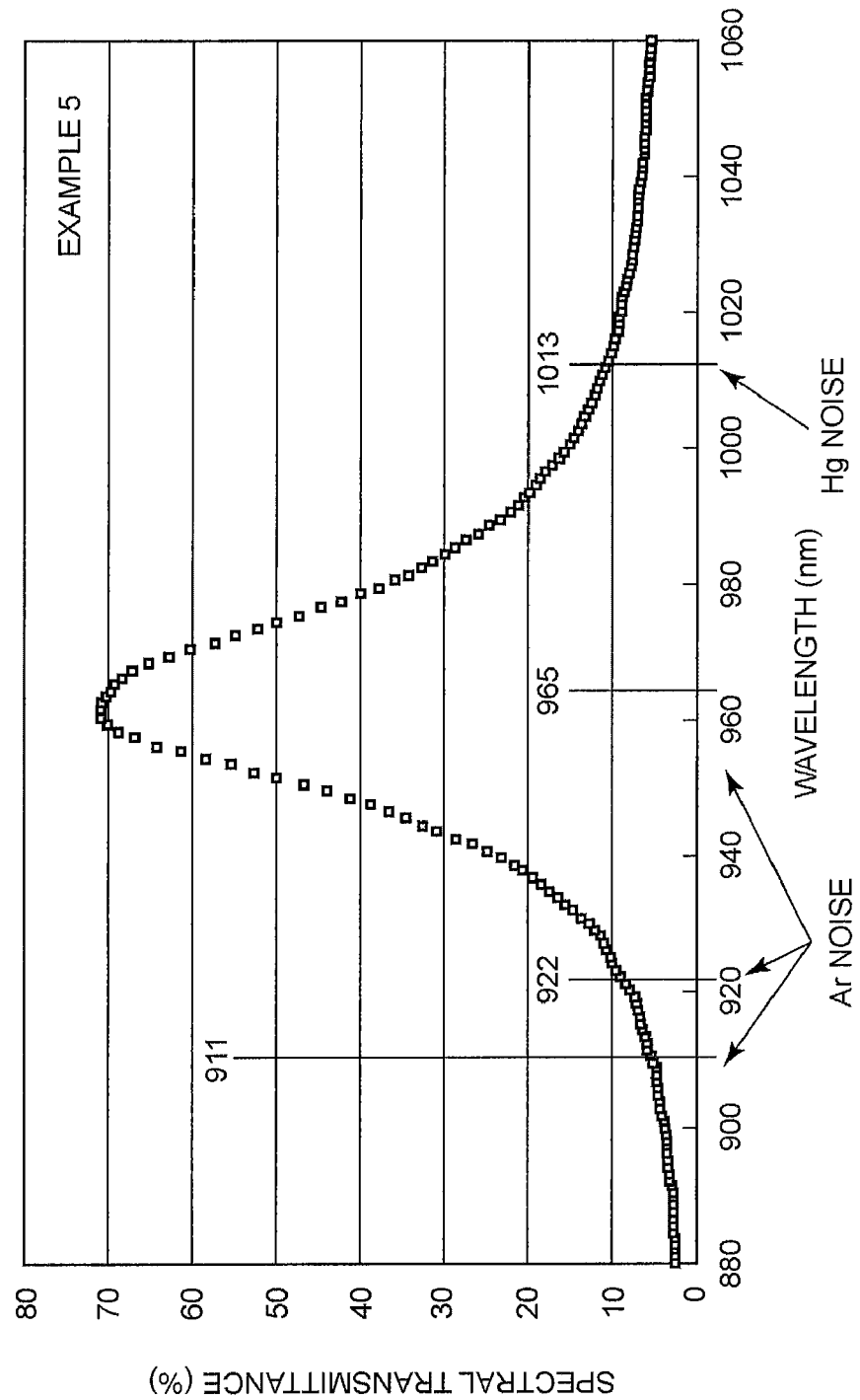
FIG. 10 is a drawing showing a spectral transmittance curve of the optical element according to Example 5.

$NbO_x$ and Si were used for the high-refractive-index material layer, $SiO_x$ was used for the low-refractive-index material layer, and the multi-layered film was stacked by sputtering, only on one surface of the PET film similar to that used in Example 1. Each layer was adjusted as follows: first layer is Si and 50 nm, second layer is $SiO_x$ and 160 nm, third layer is $NbO_x$ and 100 nm, fourth layer is $SiO_x$ and 160 nm, fifth layer is $NbO_x$ and 430 nm, sixth layer is $SiO_x$ and 160 nm, seventh layer is Si and 50 nm, and eighth layer is $SiO_x$ and 50 nm. An adherence layer may be placed between the PET film and the first layer so as to avoid peel-off occurring between layers. The transmittance and the remote controller operable distance of the obtained sample were measured according to the methods similarly to Example 1 described above. Results of the measurement are shown in Table 2 and Table 3. A spectral transmittance curve of thus-obtained sample is shown in FIG. 10.

Example 6

The optical element sample of Example 1 and the optical element sample of Example 2 were stacked, disposed at the photo-detector unit, and the transmittance and the remote controller operable distance were measured according to the methods similarly to as described in Example 1. Results of the measurement are shown in Table 2 and Table 3.

Example 7

An optical element sample was manufactured using the dye coating liquid shown below. The dye used for manufacturing the sample was given in a form of coating liquid prepared as explained below.

(Dye Coating Liquid)

Dye: phthalocyanine compound (from Nippon Shokubai Co., Ltd.) 1 part by weight

Resin: acrylic resin (from Nippon Shokubai Co., Ltd.) 10 parts by weight

Solvent: toluene 65 parts by weight

Figure 11A:
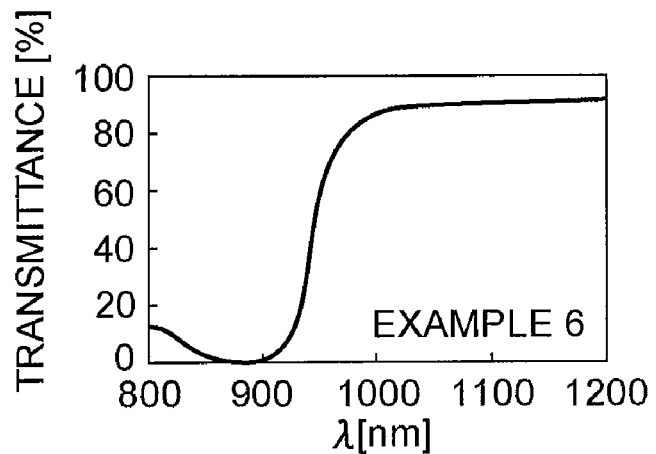
FIG. 11A to 11C are drawings showing spectral transmittance curves of the optical elements according to Examples 6 to 8 of an embodiment.

The above mixture was stirred using a stirrer to thereby prepare a dye coating liquid. The dye coating liquid was coated by spin coating on the PET film similar to that used in Example 1, to a thickness of 5 μm, and then cured. The transmittance and the remote controller operable distance of thus-obtained optical element sample were measured according to the methods similarly to Example 1 described above. Results of the measurement are shown in Table 2 and Table 3. A spectral transmittance curve of thus-obtained sample is shown in FIG. 11A.

Example 8

Figure 11B:
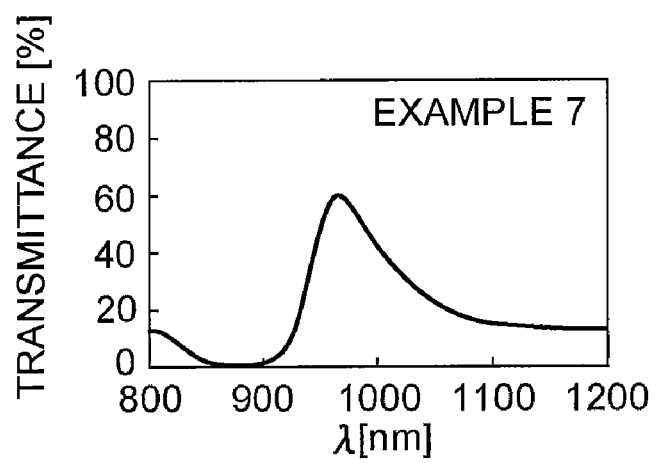

The optical element sample of Example 1 and the optical element sample of Example 7 were stacked, disposed at the photo-detector unit, and the remote controller operable distance was measured according to the method similarly to Example 1 described above. Result of the measurement was shown in Table 3. A spectral transmittance curve of thus-obtained sample is shown in FIG. 11B.

Example 9

Figure 11C:
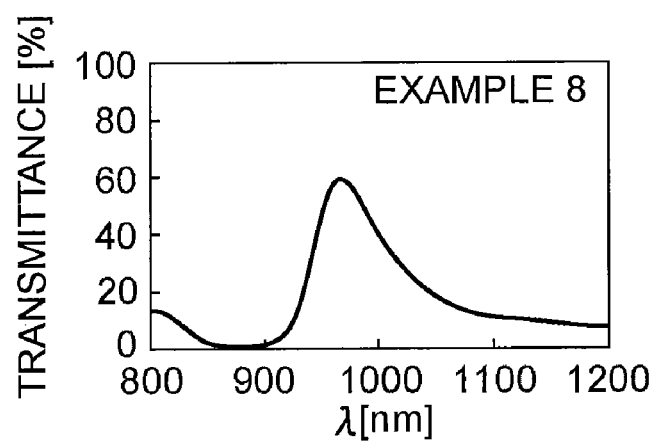

The optical element sample of Example 4 and the optical element sample of Example 6 were stacked, disposed at the photo-detector unit, and the remote controller operable distance was measured according to the method similarly to Example 1 described above. Result of the measurement was shown in Table 3. A spectral transmittance curve of thus-obtained sample is shown in FIG. 11C.

Comparative Example

The remote controller operable distance was measured in accordance with the method similarly to as described in Example 1, without disposing the optical element 4 at the photo-detector unit 20A of the optical disc drive 20. Result is shown in Table 3.

As shown in Table 3, Examples 1 and 4 showed longer remote controller operable distance as compared with Comparative Example, when measured 5 minutes after the television set was powered on. This is because the optical elements of Example 1 and Example 4 are those of intercepting the wavelength region longer than the wavelength of the remote controller signal, so that the optical elements can intercept the Hg luminescent line peak which grows after the elapse of a certain period of time after the television set was powered on.

Examples 2, 7 showed longer remote controller operable distance as compared with Comparative Example, when measured immediately after the television set was powered on. This is because the optical elements of Example 2 and Example 7 are those of intercepting the wavelength region shorter than the wavelength of the remote controller signal, so that the optical elements can intercept the Ar luminescent line peaks (911 nm, 922 nm) which generate immediately after the television set was powered on.

Examples 3, 6, 8 and 9 showed longer remote controller operable distance as compared with Comparative Example, when measured both of immediately after, and 5 minutes after the television set was powered on. This is because the optical elements of Example 3, Example 6, Example 8 and Example 9 are those of intercepting the wavelength region longer and shorter than the wavelength of the remote controller signal. Accordingly, the optical elements can intercept both of the Ar luminescent line peaks (911 nm, 922 nm) which generate immediately after the television set was powered on, and the Hg luminescent line peak which becomes large after the elapse of a certain period of time after the television set was powered on.

Furthermore, according to Examples 5 and 7, it is possible to achieve an effect of decreasing the transmittance of the infrared light having wavelength of 911 nm (Ar luminescent line peak), which causes degradation of remote controller sensitivity immediately after TV power on at a low temperature. The transmittance of the light having wavelength of 911 nm is preferable 10% or less.

As is clear from the above-described results, it was confirmed that the remote controller operable distance can be elongated, by disposing the optical element 4 of the present application in front of the remote controller photo-detector unit 20A.

Example 10

To confirm an effect of using the light guide pipe on the remote controller operable distance under operation at oblique angles, a photo-detector and a light guide pipe mounted on a liquid crystal display were detached, disposed as shown in FIG. 6B, and the photo-detector was electrically connected to an oscilloscope. The light guide pipe was composed of an acrylic resin, and $\theta 2$ in FIG. 6B was adjusted to 45°. The multi-layered film same as that in Example 1 was used for the optical element. Voltages appeared on the photo-detector when $\theta 1$ in FIG. 6B was varied as 0°, 30° and 45° were compared between the structures shown in FIG. 6A (structure (A)) and FIG. 6B (structure (B)). Results are shown in Table 4.

TABLE 4

| | Output voltage[mV] | |
|---|---|---|
| $\theta 1$ | Structure(A) | Structure(B) |
| 0° | 330 mV | 330 mV |
| 30° | 264 mV | 286 mV |
| 45° | 200 mV | 271 mV |

As is known from Table 4, the structure (B) is less susceptible to voltage drop caused by increase in $\theta 1$, as compared with the structure (A), proving that use of the light guide pipe successfully moderated influence of the angular dependence of the optical multi-layered film.

Example 11

The optical element sample of Example 1 and the optical element sample of Example 7 were stacked, disposed at the photo-detector unit, and further, the LED on the side of the remote controller is replaced with the one whose the center wavelength corresponds to the transmittance peak (970 nm) of the optical element sample. The remote controller operable distance of the obtained sample was measured according to the method similarly to Example 1 described above. Result of the measurement was shown in Table 3.

The present embodiment resulted in the maximum remote controller operable distance at the time point both immediately after TV power on and five minutes after TV power on.

As has been described in the above, according to the present application, the liquid crystal display and the peripheral instruments can successfully be suppressed from being excessively degraded in the sensitivity to remote controllers, caused by near infrared radiation emitted from the liquid crystal display.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An infrared signal receiver comprising:
   a photo-detector unit receiving light of a predetermined infrared wavelength region, sent from a remote operating unit; and
   an optical element disposed in front of the photo-detector unit, allowing the light of the predetermined infrared wavelength region to transmit therethrough in preference to other infrared wavelength region,
   wherein:
   the predetermined signal wavelength region is a region of 930 nm or longer and 960 nm or shorter,
   mean transmittance of light of the optical element in the predetermined signal wavelength region at an angle of incidence of 0° is larger than mean transmittance of light in a region of 900 nm or longer and 930 nm or shorter, and/or, mean transmittance of light in a region of 960 nm or longer and 1,020 nm or shorter, and
   the predetermined infrared wavelength region sent from the remote operating unit and a peak position of the transmittance of the optical element match each other.

2. The infrared signal receiver as claimed in claim 1, wherein the optical element is a multi-layered film composed of a plurality of substances having different refractive indices.

3. The infrared signal receiver as claimed in claim 1, wherein the optical element is a dye-containing layer, or a composite layer of the dye-containing layer and a multi-layered film composed of a plurality of substances having different refractive indices.

4. The infrared signal receiver as claimed in claim 1, further comprising a beam guide component, disposed between the remote operating unit and the photo-detector unit, causing modification in direction of propagation of infrared beam,
   wherein:
   the optical element is disposed on a beam exit surface of the beam guide component, which opposes to the photo-detector unit.

5. The infrared signal receiver as claimed in claim 1, wherein the optical element includes a multi-layered film having a plurality of high-refractive-index material layers and a plurality of low-refractive-index material layers alternately stacked on a transparent substrate.

6. A liquid crystal display comprising:
   a photo-detector unit receiving light of a predetermined infrared wavelength region, sent from a remote operating unit; and
   an optical element disposed in front of the photo-detector unit, allowing the light of the predetermined signal wavelength region to transmit therethrough in preference to other infrared wavelength region,
   wherein:
   the predetermined signal wavelength region is a region of 930 nm or longer and 960 nm or shorter,
   mean transmittance of light of the optical element in the predetermined signal wavelength region at an angle of incidence of 0° is larger than mean transmittance of light in a region of 900nm or longer and 930 nm or shorter, and/or, mean transmittance of light in a region of 960 nm or longer and 1,020 nm or shorter, and
   wherein the predetermined infrared wavelength region sent from the remote operating unit and a peak position of the transmittance of the optical element match each other.

7. The liquid crystal display as claimed in claim 6, wherein:
   the photo-detector unit is disposed as being directed to a direction different from a vertical line on a display surface, and
   a beam guide component is disposed between the remote operating unit and the photo-detector unit, causing modification in direction of propagation of infrared beam,
   wherein the optical element is disposed on a beam exit surface of the beam guide component, which opposes to the photo-detector unit.

8. The liquid crystal display as claimed in claim 6, wherein the optical element includes a multi-layered film having a plurality of high-refractive-index material layers and a plurality of low-refractive-index material layers alternately stacked on a transparent substrate.

9. An optical element disposed in front of a photo-detector unit which receives light in a predetermined infrared wavelength region sent from a remote operating unit, allowing the light of the predetermined signal wavelength region to transmit therethrough in preference to other infrared wavelength region, wherein:
   the optical element has mean transmittance of light at an angle of incidence of 0° in the region of 930 nm or longer and 960 nm or shorter, is larger than mean transmittance of light in a region of 900 nm or longer and 930 nm or shorter, and/or, mean transmittance of light in a region of 960 nm or longer and 1,020 nm or shorter,
   wherein the predetermined infrared wavelength region sent from the remote operating unit and a peak position of the transmittance of the optical element match each other.

10. The optical element as claimed in claim 9, further comprising a pressure-sensitive adhesive layer provided on one surface of the optical element.

11. The optical element as claimed in claim 9, wherein the optical element includes a multi-layered film having a plurality of high-refractive-index material layers and a plurality of low-refractive-index material layers alternately stacked on a transparent substrate.

12. An infrared signal receiver system comprising:
   a remote operating unit;
   a photo-detector unit receiving light of a predetermined infrared wavelength region, sent from the remote operating unit; and
   an optical element disposed in front of the photo-detector unit, allowing the light of the predetermined infrared wavelength region to transmit therethrough in preference to other infrared wavelength region,
   wherein:
   the predetermined signal wavelength region is a region of 930 nm or longer and 960 nm or shorter,
   mean transmittance of light of the optical element in the predetermined signal wavelength region at an angle of incidence of 0° is larger than mean transmittance of light in a region of 900 nm or longer and 930 nm or shorter, and/or, mean transmittance of light in a region of 960 nm or longer and 1,020 nm or shorter, and
   the predetermined infrared wavelength region sent from the remote operating unit and a peak position of the transmittance of the optical element match each other.

* * * * *